US010029419B2

(12) United States Patent
Anderson, Jr. et al.

(10) Patent No.: US 10,029,419 B2
(45) Date of Patent: Jul. 24, 2018

(54) METHOD FOR GENERATING A FRAMEWORK FOR THREE DIMENSIONAL PRINTED PARTS

(71) Applicant: Xerox Corporation, Norwalk, CT (US)

(72) Inventors: Robert B. Anderson, Jr., Syracuse, NY (US); Timothy P. Foley, Marion, NY (US); Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 310 days.

(21) Appl. No.: 14/751,600

(22) Filed: Jun. 26, 2015

(65) Prior Publication Data

US 2016/0375639 A1 Dec. 29, 2016

(51) Int. Cl.
*B29C 67/00* (2017.01)
*G05B 19/4099* (2006.01)
*G06T 19/20* (2011.01)
*B33Y 50/02* (2015.01)

(52) U.S. Cl.
CPC ...... *B29C 67/0088* (2013.01); *G05B 19/4099* (2013.01); *G06T 19/20* (2013.01); *B33Y 50/02* (2014.12); *G05B 2219/35134* (2013.01); *G05B 2219/49007* (2013.01); *Y02P 90/265* (2015.11)

(58) Field of Classification Search
None
See application file for complete search history.

(56) References Cited

U.S. PATENT DOCUMENTS

| 5,321,622 | A * | 6/1994 | Snead | B29C 67/0062 345/419 |
| 5,454,069 | A * | 9/1995 | Knapp | G06T 17/00 345/420 |
| 6,280,784 | B1 * | 8/2001 | Yang | A21C 11/163 425/112 |
| 6,558,606 | B1 * | 5/2003 | Kulkarni | B29C 67/007 264/401 |
| 6,708,071 | B1 * | 3/2004 | Turner | G05B 19/4097 345/419 |
| 7,003,864 | B2 * | 2/2006 | Dirscherl | B22F 3/008 219/121.26 |
| 2002/0143419 | A1 * | 10/2002 | Praun | G06T 17/20 700/98 |
| 2003/0178750 | A1 * | 9/2003 | Kulkarni | B29C 67/007 264/401 |
| 2004/0008868 | A1 * | 1/2004 | Bornowski | G01S 7/4802 382/103 |

(Continued)

*Primary Examiner* — Jason Lin
(74) *Attorney, Agent, or Firm* — Maginot Moore & Beck LLP

(57) ABSTRACT

A method of operating a three-dimensional object printer has been developed. The method receives image data corresponding to at least one three-dimensional object. The method generates image data corresponding to at least one member that extends from the at least one three-dimensional object corresponding to the received image data. The method operates an ejector head of the three-dimensional object printer with a controller referencing the received image data and the generated image data to eject drops of a build material onto a platen to form the at least one three-dimensional object and the at least one member extending from the at least one three-dimensional object.

8 Claims, 11 Drawing Sheets

(56) References Cited

U.S. PATENT DOCUMENTS

| | | | |
|---|---|---|---|
| 2004/0222561 A1* | 11/2004 | Hopkins | B29C 67/0055 264/308 |
| 2005/0131570 A1* | 6/2005 | Jamalabad | B29C 67/0092 700/119 |
| 2006/0198975 A1* | 9/2006 | Kikuchi | B29C 65/3656 428/35.8 |
| 2008/0040080 A1* | 2/2008 | Bae | G06F 17/50 703/1 |
| 2008/0100326 A1* | 5/2008 | Chen | G01R 1/0483 324/755.07 |
| 2008/0234687 A1* | 9/2008 | Schaller | A61B 17/8852 606/90 |
| 2010/0086721 A1* | 4/2010 | Batchelder | B65D 81/113 428/43 |
| 2011/0249298 A1* | 10/2011 | Gullentops | B29C 67/0059 358/1.18 |
| 2012/0010741 A1* | 1/2012 | Hull | B29C 67/0092 700/98 |
| 2013/0307193 A1 | 11/2013 | Johnson et al. | |
| 2014/0060115 A1 | 3/2014 | Saarela et al. | |
| 2015/0066178 A1* | 3/2015 | Stava | B29C 67/0088 700/98 |
| 2015/0099025 A1* | 4/2015 | Spalt | B29C 67/0088 425/166 |
| 2016/0052016 A1* | 2/2016 | Te | B05D 3/002 427/290 |
| 2016/0288423 A1* | 10/2016 | Dufort | B29C 67/0085 |

\* cited by examiner

METHOD FOR GENERATING A FRAMEWORK FOR THREE DIMENSIONAL PRINTED PARTS

TECHNICAL FIELD

The method disclosed in this document relates to three-dimensional object printing and, more particularly, to generation of a framework for three-dimensional printed objects.

BACKGROUND

Digital three-dimensional manufacturing, also known as digital additive manufacturing, is a process of making a three-dimensional solid object of virtually any shape from a digital model. Three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Manufacturing of a finished product often involves forming many smaller parts that are processed and then assembled together into the finished product. Additionally, large quantities of identical parts are commonly manufactured at the same time. As post-processing and assembly of printed parts becomes more automated, management of families of related parts becomes a challenge. What is needed is a method of managing families of printed parts that is easily integrated into automated and high-speed post-processing methods.

SUMMARY

A method of operating a three-dimensional object printer includes the steps of receiving image data corresponding to at least one three-dimensional object; generating image data corresponding to at least one member that extends from the at least one three-dimensional object corresponding to the received image data; and operating an ejector head of the three-dimensional object printer with a controller referencing the received image data and the generated image data to eject drops of a build material onto a platen to form the at least one three-dimensional object and the at least one member extending from the at least one three-dimensional object.

BRIEF DESCRIPTION OF THE DRAWINGS

The foregoing aspects and other features of the method of operating a three-dimensional object printer are explained in the following description, taken in connection with the accompanying drawings.

DETAILED DESCRIPTION

Figure 1:
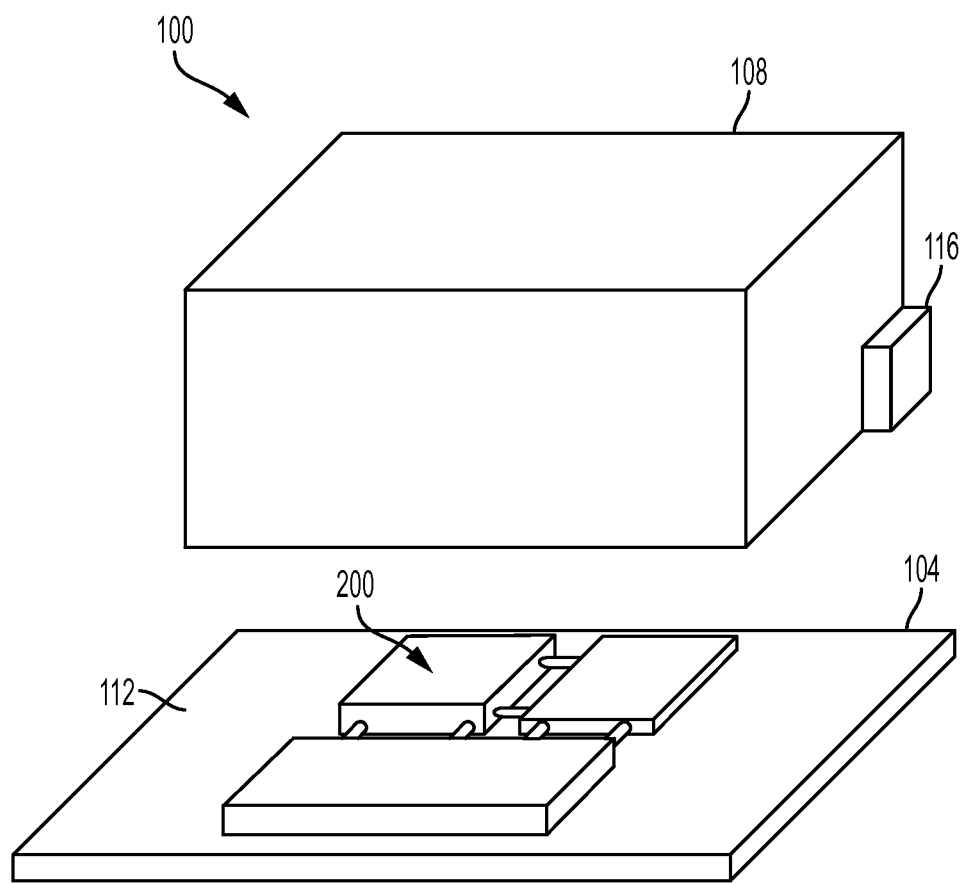
FIG. 1 shows a three-dimensional object printer.

For a general understanding of the environment for the method disclosed herein as well as the details for the method, reference is made to the drawings. In the drawings, like reference numerals designate like elements.

FIG. 1 shows a three-dimensional object printer 100. The printer 100 comprises a platen 104 and an ejector head 108. The ejector head 108 has a plurality of ejectors configured to eject drops of a build material onto a surface 112 of the platen 104 to form a three-dimensional object, such as the family of parts 200. In some embodiments, the ejector head has a first plurality of ejectors configured to eject drops of a build material and a second plurality of ejectors configured to eject drops of a support material, such as wax. The printer 100 further includes a controller 116 operatively connected to the ejector head 108 and configured to operate the ejector head 108 with reference to image data to form a three dimensional object on the platen 112 that corresponds to the image data.

Figure 2:
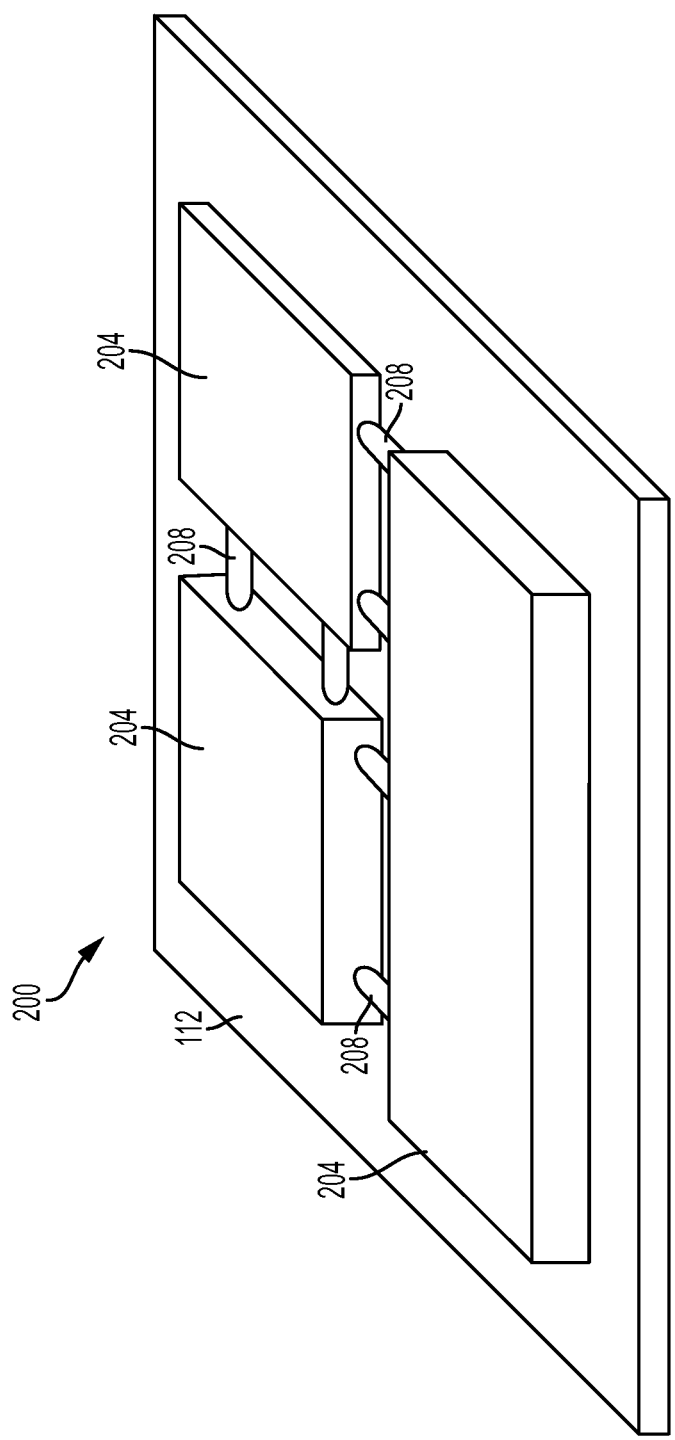
FIG. 2 shows a family of parts having interconnecting members.

FIG. 2 shows the family of parts 200 manufactured according to the disclosure. The family of parts 200 includes a plurality of parts 204 that are interconnected by a plurality of members 208. The parts 204 are three-dimensional objects that are printed by the printer 100 with reference to image data corresponding to the parts 204. The members 208 are generated automatically by the controller 116 before printing the parts 204. In some embodiments, the members 208 are used to keep the parts 204 together during post-processing. Post-processing includes steps such as removal of the parts 204 from the platen 112, cleaning the parts 204, machining the parts 204, polishing the parts 204, coating the parts 204, and curing the parts 204. In some embodiments, the members 208 are configured to aid in post-processing steps. In some embodiments, the members 208 are removed after post-processing is completed. In other embodiments, the members 208 are further used to keep the parts 204 together during shipping or storage and later removed by an end-user of the parts 204.

Figure 3:
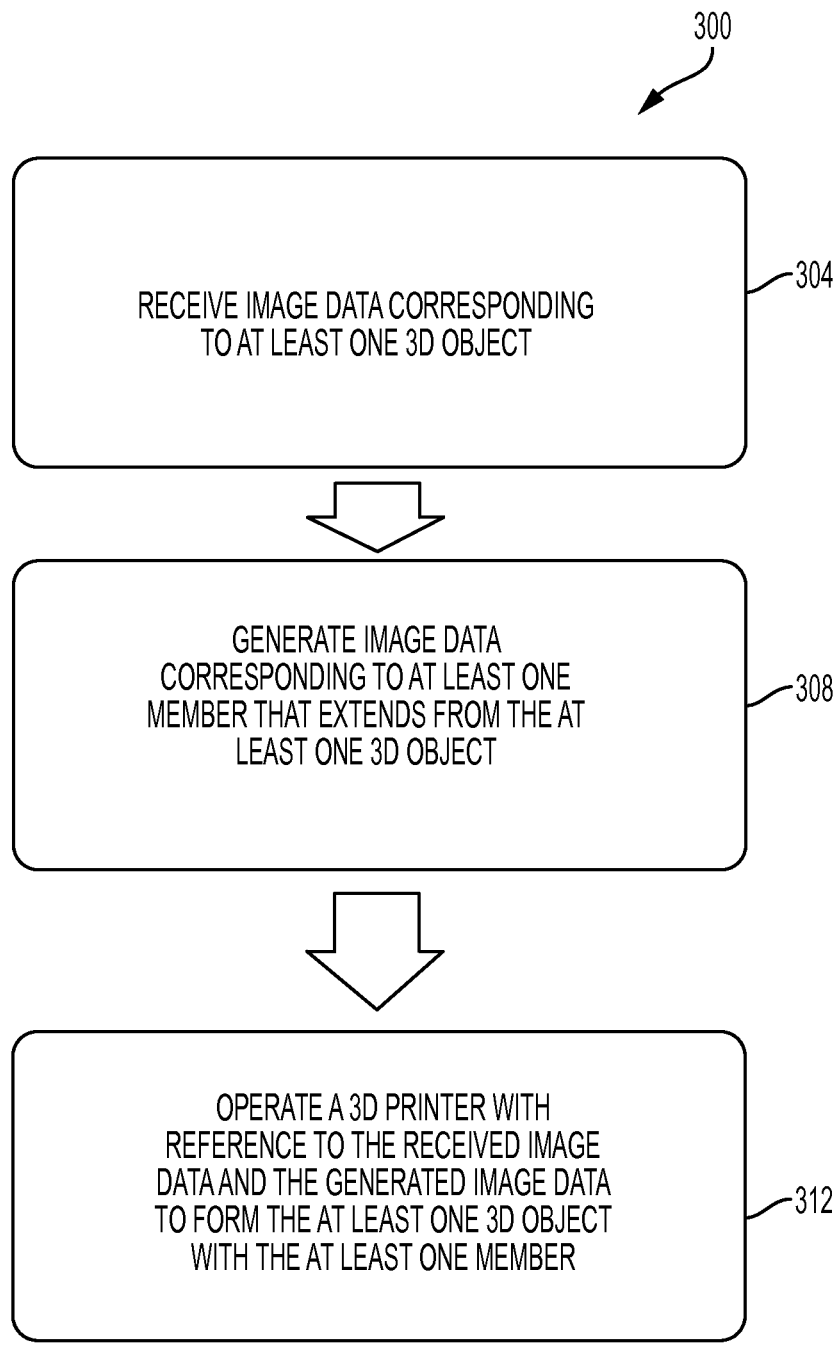
FIG. 3 shows a method of operating a three-dimensional object printer.

A method 300 for operating a three-dimensional object printer is shown in FIG. 3. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 116 noted above can be such a controller or processor. Alternatively, the controller can be implemented with more than one processor and associated circuitry and components, each of which is configured to form one or more tasks or functions described herein.

When the method 300 is performed, it begins by receiving image data corresponding to at least one three-dimensional object (block 304). The controller 116 receives image data corresponding to the parts 204. In one embodiment, the controller 116 receives the image data from a connected memory device or from memory integrated into the controller 116. In other embodiments, the controller 116 receives the image data from a data connection that is operably connected to another controller or computing device that is configured to send the image data to the controller 116.

Figure 4:
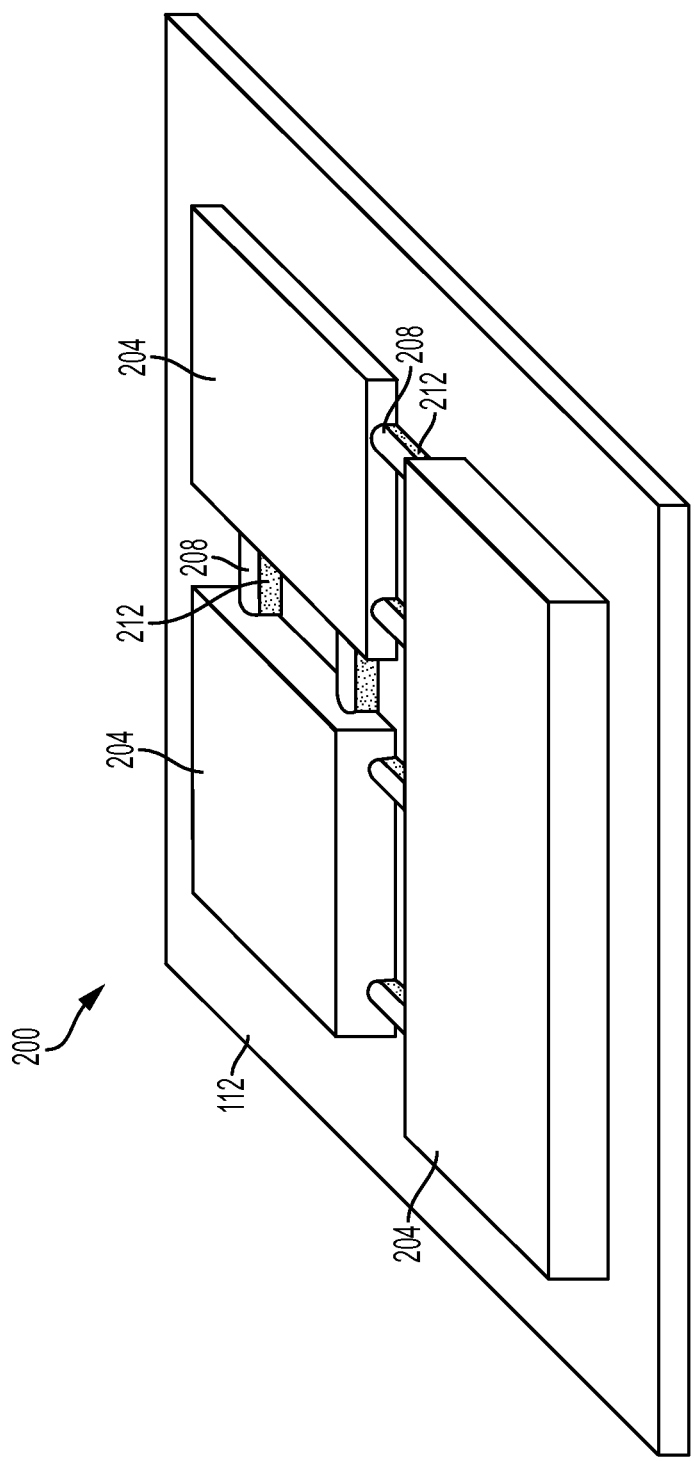
FIG. 4 shows a family of parts having support areas for interconnecting members.

Next, the method 300 generates image data corresponding to at least one member that extends from the at least on three-dimensional object (block 308). The controller 116 generates image data corresponding to the members 208, which extend between the parts 204 to connect one of the parts 204 with another of the parts 204. The generated image data includes image data that forms the members 208 with build material and image data that forms support areas for the members 208 with support material. FIG. 4 shows the family of parts 200 with support areas 212 formed. The formation of the support areas 212 enables members 208 to be formed between the parts 204. The support areas 212 are formed in many of the embodiments of this disclosure, even if not specifically stated.

In some embodiments, to generate the image data corresponding to the members 208, the controller 116 first determines an arrangement of the parts 204 with respect to one another. Next, the controller 116 identifies locations on the surfaces of the parts 204 for attaching the members 208. Then, the controller 116 generates image data corresponding to members 208 extending between the identified locations on the surfaces of the parts 204 and the support areas required so the members 208 can be formed.

Next, the method 300 operates a three-dimensional object printer with reference to the received image data and the generated image data to form the at least one three-dimensional object with the at least one member (block 312). The controller 116 operates the ejector head 108 with reference to the received image data corresponding to the parts 204 and the generated image data corresponding to the members 208 to eject drops of a build material onto the platen to form the family of parts 200, which comprises the parts 204 and the members 208.

Figure 5:
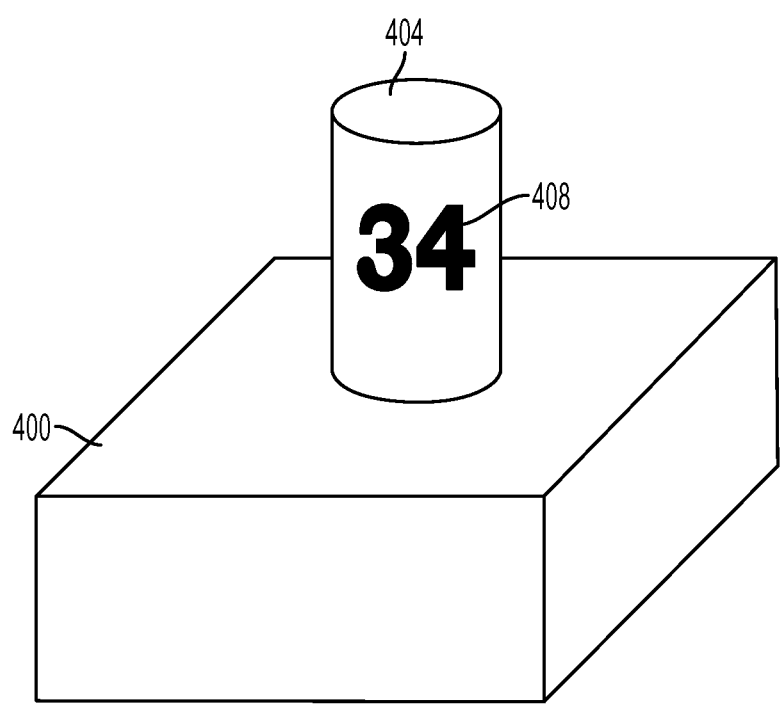
FIG. 5 shows a part having a member with indicia.

In some embodiments, the controller 116 generates image data corresponding to indicia on the at least one of the members 208. FIG. 5 shows a part 400 having a member 404 having indicia 408. In some embodiments, the indicia 408 serve as identifying information for the part 400. In embodiments in which the member 404 extends to connect the part 400 to another part, the indicia 408 is located closer to the part for which it serves as identifying information. In the embodiment shown, the indicia 408 are numbers that are embossed onto the member 404. In other embodiments, the indicia include alphanumeric codes, bar codes, or quick response codes (QR codes).

Figure 6:
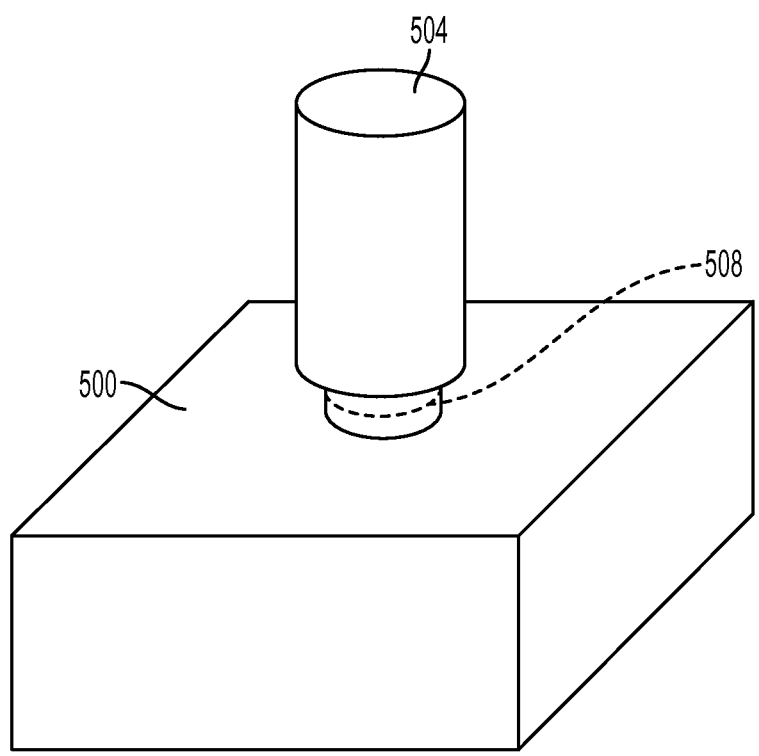
FIG. 6 shows a part having a member with a perforated joint.

In some embodiments, the controller 116 generates image data corresponding to a perforated joint between at least one of the members 208 and at least one of the parts 204. FIG. 6 shows a part 500 having a member 504 extending from a surface. The member 504 includes a perforated joint 508 that attaches the member 504 to the part 500. The perforated joint 508 is configured to facilitate separation of the member 504 from the part 500 by being easily broken. In some embodiments, the perforated joint 508 includes a plurality of holes that extend through the member 504 and weaken the member 504 at the perforated joint 508. In some embodiments, the perforated joint 508 includes a portion of the member 504 that is narrower than another portion of the member 504. The perforated joint 508 is broken to remove the member 504 from the part 500.

Figure 7:
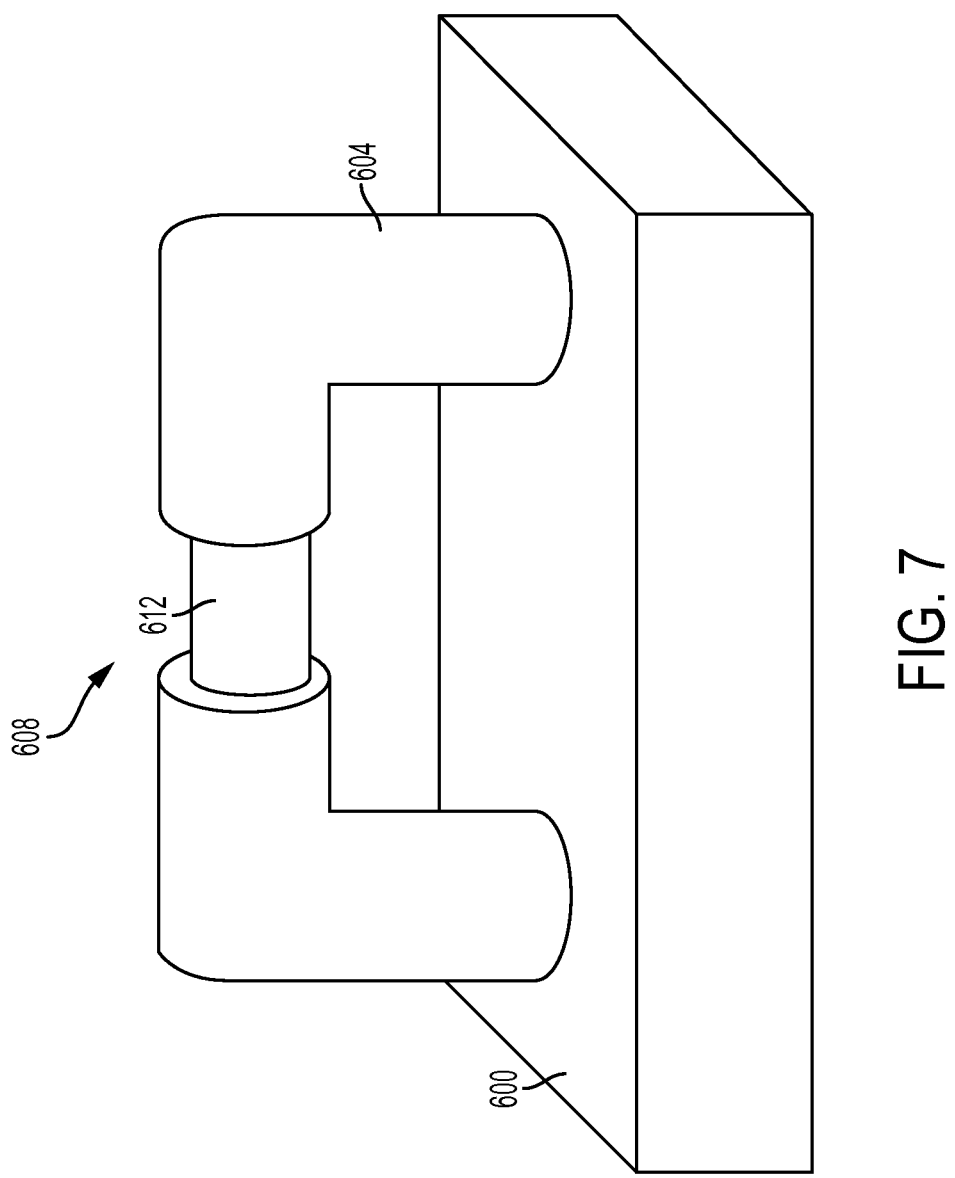
FIG. 7 shows a part having a member with a handle portion.

In some embodiments, the controller 116 generates image data corresponding to a member 208 having a portion configured to be grasped by a machine. FIG. 7 shows a part 600 having a member 604 extending from a surface. In the embodiment shown, the member 604 has a handle portion 608 configured to be grasped by a machine having a grasping device such as a robotic arm, a clamp, or other similar devices. In one embodiment, the handle portion 608 comprises a slotted area 612 that enables the grasping device to grasp onto the member 604 at a consistent and defined location. The handle portion enables post-processing steps to be more easily automated by machines such as pick and place robots.

Figure 8:
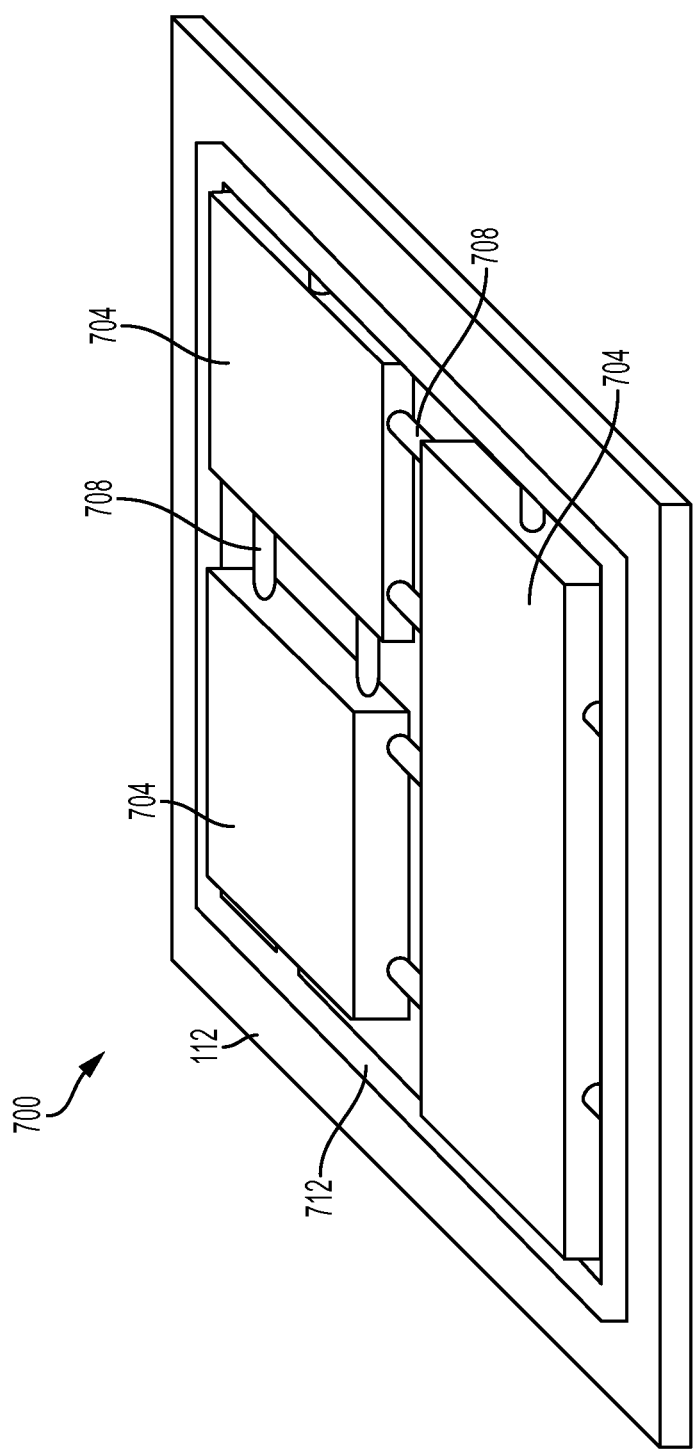
FIG. 8 shows a family of parts having interconnecting members that form a perimeter around the parts.

In some embodiments, the controller 116 generates image data corresponding to a plurality of interconnected members 208 that form a perimeter around the parts 204. These generated image data also include support areas that enable the formation of the interconnected members 208. FIG. 8 shows a family of parts 700 comprising a plurality of parts 704 that are interconnected by a plurality of members 708. At least some of the members 708 interconnect with each other to form a perimeter 712 around the parts. In one embodiment, longitudinal axes of each of the members 708 lie in a common plane. The perimeter 712 helps protect the parts 704 from accidental damage during post-processing or shipping.

Figure 9:
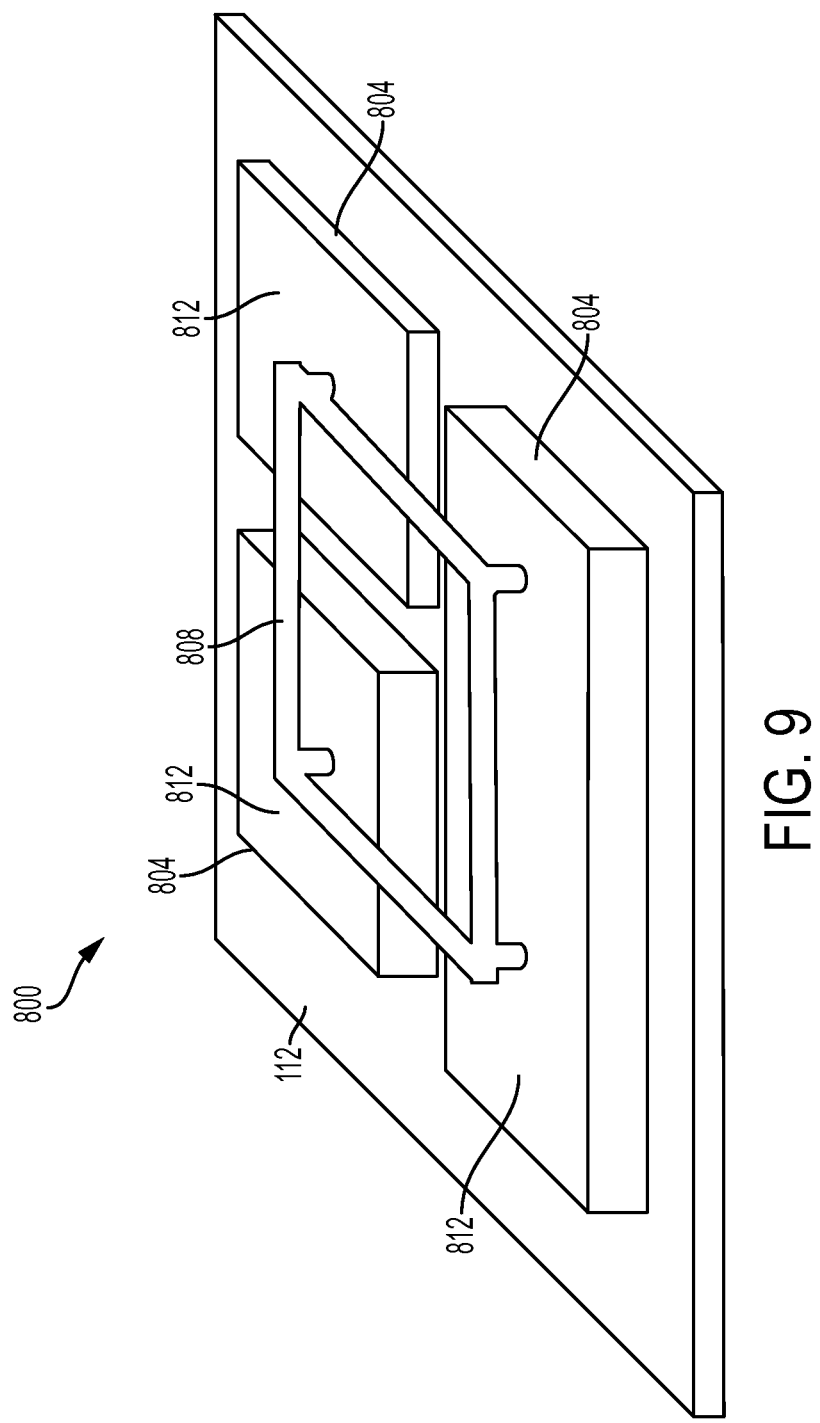
FIG. 9 shows a family of parts having interconnecting members attached to the face of the parts.

In some embodiments, the controller 116 generates image data corresponding to a plurality of interconnected members 208 that connect to faces of the parts 204 that are opposite the platen 112. These generated image data also include support areas that enable the formation of the interconnected members 208. FIG. 9 shows a family of parts 800 comprising a plurality of parts 804 that are interconnected by a plurality of members 808. At least some of the members 808 connect to faces 812 of the parts 804. The faces 812 are surfaces of the parts 804 that are opposite the platen 112 on which the family of parts 800 are formed. In one embodiment, all of the members 808 are positioned on a side of the parts 804 that is opposite the platen 112.

Figure 10:
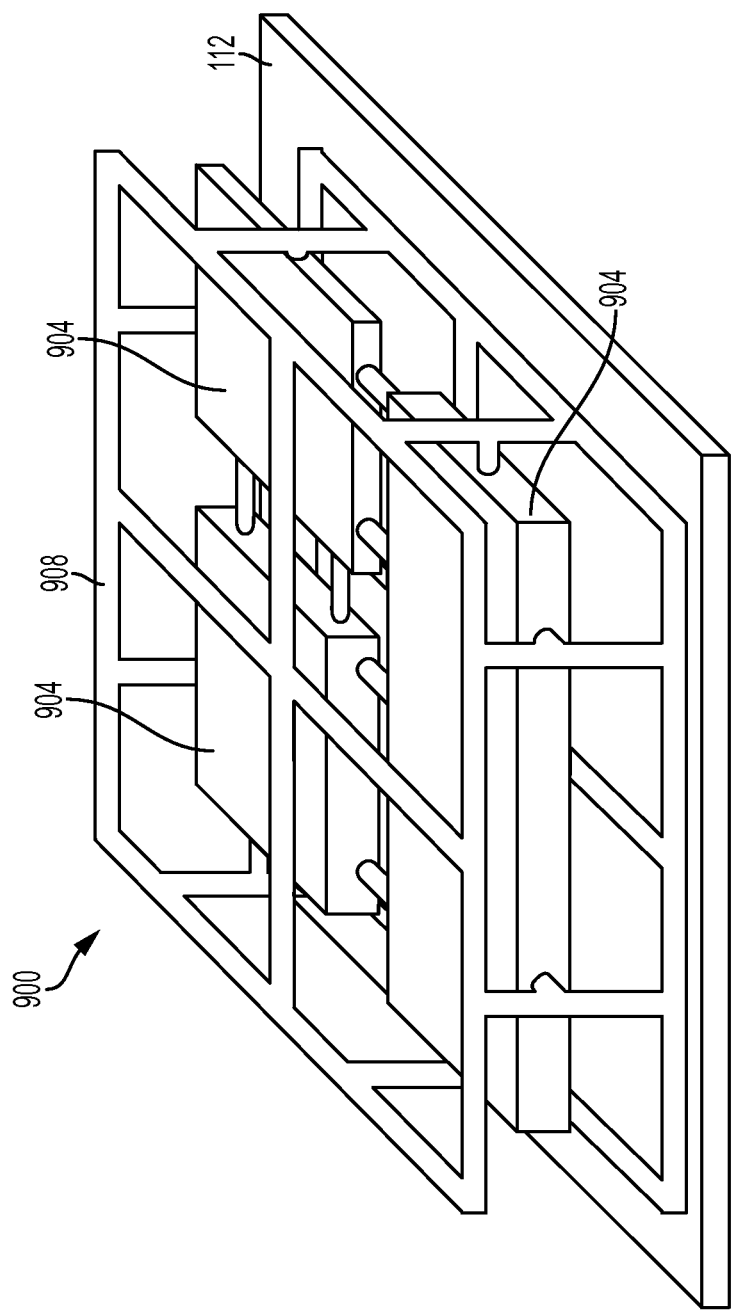
FIG. 10 shows a family of parts having interconnecting members that form a cage that surrounds the parts.

In some embodiments, the controller 116 generates image data corresponding to a plurality of interconnected members 208 that surround the parts 204 to form a cage. These generated image data also include support areas that enable the formation of the interconnected members 208. FIG. 10 shows a family of parts 900 comprising a plurality of parts 904 that are interconnected by a plurality of members 908. The members 908 interconnected to form a cage that surrounds parts 904. In one embodiment, the parts 904 are suspended above the platen 112 by a first distance. The cage helps protect the parts 904 from accidental damage during post-processing or shipping.

Figure 11:
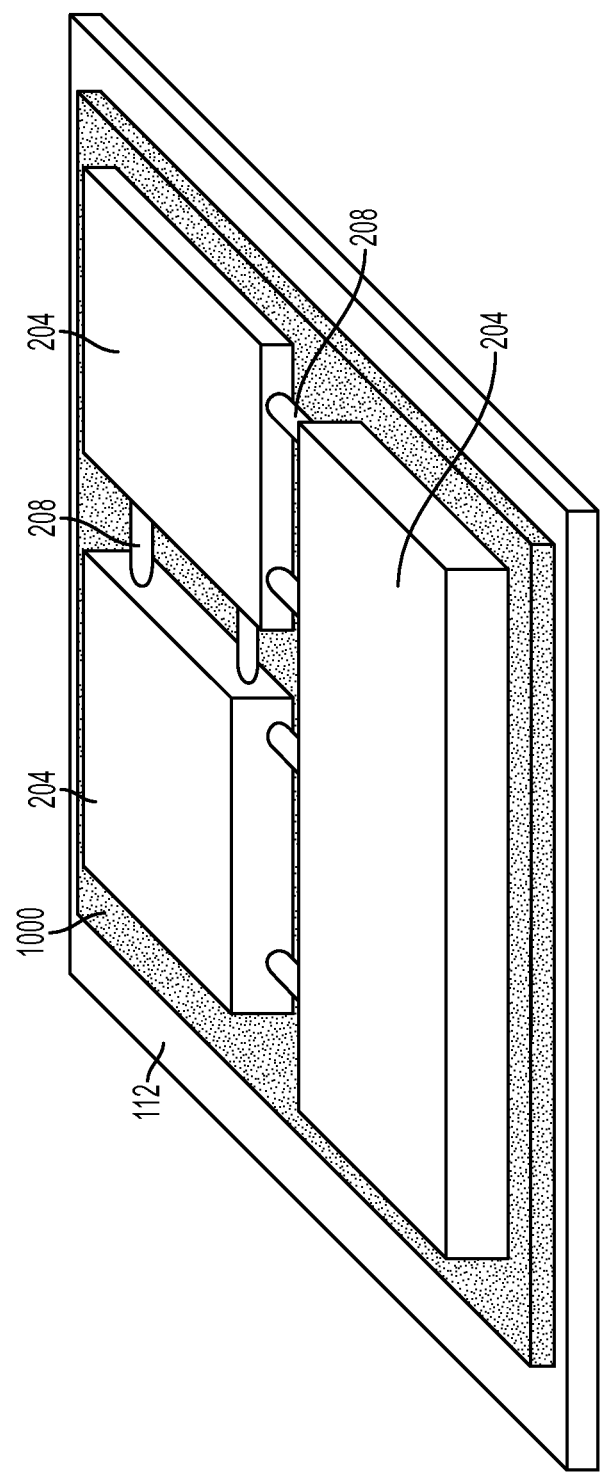
FIG. 11 shows a family of parts formed upon a support layer.

FIG. 11 shows the family of parts 200 formed upon a support layer 1000. In some embodiments, before operating the ejector head 108 to form the family of parts 200, the controller 116 operates the ejector head 108 drops of a support material onto the platen 112 to form the support layer 1000 on the platen 112. In one embodiment, the support material comprises a wax. After forming the support layer 1000, the controller operates the ejector head 108 to form the family of parts 200 as described above. The support layer 1000 makes the family of parts 200 easier to remove from the platen 112 after printing. The family of parts 200 with the support layer 1000 can be removed from the platen 112 without damage to the parts 204 by blade scraping, twisting of the platen 112 to cause sheer force, or by any other method.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of operating a three-dimensional object printer comprising:
   receiving image data corresponding to at least one three-dimensional object;
   generating image data corresponding to at least one member that extends from the at least one three-dimensional object that corresponds to the received image data and generating image data corresponding to indicia to be formed on the at least one member; and
   operating an ejector head of the three-dimensional object printer with a controller referencing the received image data, the generated image data corresponding to the at least one member, and the generated image data that corresponds to the indicia to be formed on the at least one member to eject drops of a build material onto a platen to form the at least one three-dimensional object as a first three-dimensional object and a second three-dimensional object with the at least one member with the indicia on the at least one member extending between the first three-dimensional object and the second three-dimensional object, the indicia on the at least one member identifying the first three-dimensional object and the indicia being positioned on the at least one member closer to the first three-dimensional object than to the second three-dimensional object to indicate the indicia on the at least one member is associated with the first three-dimensional object.

2. The method of claim 1, the generation of the image data further comprising:
   generating image data corresponding to a perforated joint between the at least one member and the first three-dimensional object to facilitate separation of the at least one member from the first three-dimensional object.

3. The method of claim 1, the operation of the ejector head further comprising:
   operating the ejector head of the three-dimensional object printer with the controller referencing the received image data and the generated image data to eject drops of the build material onto the platen to form the at least one member as a plurality of interconnected members forming a perimeter around the first three-dimensional object and the second three-dimensional object.

4. The method of claim 3, the formation of the perimeter further comprising:
   forming the plurality of interconnected members with a longitudinal axis of each member in the plurality of interconnected members being in a common plane.

5. The method of claim 1, the operation of the ejector head further comprising:
   operating the ejector head of the three-dimensional object printer with the controller referencing the received image data and the generated image data to eject drops of the build material onto the platen to form the at least one three-dimensional object with the at least one member as a plurality of interconnected members that connect to a face of the first three-dimensional object, the face of the first three-dimensional object being a surface that is opposite a surface that faces the platen.

6. The method of claim 1, the operation of the ejector head further comprising:
   operating the ejector head of the three-dimensional object printer with the controller referencing the received image data and the generated image data to eject drops of the build material onto the platen to form the at least one member as a plurality of interconnected members that surround the first three-dimensional object and the second three-dimensional object.

7. The method of claim 1, the operation of the ejector head further comprising:
   operating the ejector head to form a layer of support material on the platen prior to forming the at least one three-dimensional object as the first three-dimensional object and the second three-dimensional object with the at least one member extending between the first three-dimensional object and the second three-dimensional object, the layer of support material having a width and a length that is greater than a perimeter about the first three-dimensional object and the second three-dimensional object with the at least one member extending between the first three-dimensional object and the second three-dimensional object.

8. The method of claim 1, the generation of the image data further comprising:
   generating image data corresponding to support areas that are formed between the platen and the at least one member to enable formation of the at least one member.

\* \* \* \* \*